(12) United States Patent
Takeyoshi et al.

(10) Patent No.: US 7,890,759 B2
(45) Date of Patent: Feb. 15, 2011

(54) CONNECTION ASSISTANCE APPARATUS AND GATEWAY APPARATUS

(75) Inventors: Haruyuki Takeyoshi, Kawasaki (JP); Naoki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1272 days.

(21) Appl. No.: 11/359,360

(22) Filed: Feb. 22, 2006

(65) Prior Publication Data
US 2007/0079368 A1    Apr. 5, 2007

(30) Foreign Application Priority Data
Sep. 30, 2005  (JP)  .............................. 2005-285983

(51) Int. Cl.
  *H04L 9/32*    (2006.01)
  *H04L 29/06*   (2006.01)
  *H04L 9/00*    (2006.01)
  *H04L 9/08*    (2006.01)
  *H04L 9/28*    (2006.01)
  *G06F 21/00*   (2006.01)
  *G06F 7/04*    (2006.01)
  *G06F 17/00*   (2006.01)
  *H04K 1/00*    (2006.01)

(52) U.S. Cl. .................. 713/171; 713/153; 713/161; 713/182; 726/4; 726/5; 726/6; 726/11; 726/12; 726/26; 380/255; 380/259; 380/262; 380/278; 380/44; 380/28

(58) Field of Classification Search .................. 713/171, 713/153, 161, 182; 726/4–6, 11, 12, 26; 380/255, 259, 262, 278, 44, 28
See application file for complete search history.

(56) References Cited

U.S. PATENT DOCUMENTS

| 6,141,755 A  * | 10/2000 | Dowd et al. .................... 726/11 |
| 6,879,690 B2 * |  4/2005 | Faccin et al. ................ 380/247 |

(Continued)

FOREIGN PATENT DOCUMENTS

JP    2002-077274    3/2002

(Continued)

OTHER PUBLICATIONS

"Japanese Office Action" mailed on Mar. 9, 2010, in corresponding JP Patent Application No. 2005-285983; Partial English Translation.

*Primary Examiner*—Aravind K Moorthy
(74) *Attorney, Agent, or Firm*—Fujitsu Patent Center

(57) ABSTRACT

A connection assistance apparatus avoids unauthorized access and DoS attacks, prevents a performance degradation from occurring, and does not need to recognize different connections to gateway apparatus. An authenticating unit authenticates the validity of a terminal by checking if the terminal is a valid terminal capable of communicating with a gateway apparatus according to IPSec in response to a request from a user who owns the terminal. If it is judged that the terminal is a valid terminal, then a preshared key generating unit generates a preshared key for the terminal and the gateway apparatus, and a firewall opening instruction information generating unit generates firewall opening instruction information to open a firewall of the gateway apparatus. A transmitting unit sends the preshared key to the terminal and the gateway apparatus and sends the firewall opening instruction information to the gateway apparatus.

17 Claims, 24 Drawing Sheets

U.S. PATENT DOCUMENTS

| | | | |
|---|---|---|---|
| 7,242,689 B2 * | 7/2007 | Ikemura et al. | 370/401 |
| 7,628,322 B2 * | 12/2009 | Holtmanns et al. | 235/380 |
| 7,665,132 B2 | 2/2010 | Hisada | |
| 2002/0042875 A1 * | 4/2002 | Shukla | 713/151 |
| 2004/0059951 A1 * | 3/2004 | Pinkas et al. | 713/202 |
| 2004/0221154 A1 * | 11/2004 | Aggarwal | 713/151 |
| 2006/0015935 A1 * | 1/2006 | Dixon et al. | 726/11 |
| 2006/0174108 A1 * | 8/2006 | Loughran et al. | 713/160 |
| 2007/0105549 A1 * | 5/2007 | Suda et al. | 455/426.2 |

FOREIGN PATENT DOCUMENTS

| | | |
|---|---|---|
| JP | 2004-220120 A | 8/2004 |
| JP | 2004-242161 | 8/2004 |
| WO | WO-2005/004418 | 1/2005 |

\* cited by examiner

| USER ID | PWD |
|---------|-----|
| User-A | xx |
| User-B | yy |
| User-C | zz |

| USER ID | PROTOCOL | PORT |
|---|---|---|
| User-A | IPSec | IKE(UDP/500), ESP(50) |
| User-A | HTTPS | 443 |
| User-B | HTTPS | 443 |

| GW_ID | GW_IP |
|---|---|
| home_x | xxx.xxx.xxx.xxx |
| home_y | xxx.xxx.xxx.xxx |
| home_z | xxx.xxx.xxx.xxx |

| USER ID | SESSION ID |
|---------|------------|
| User-A | PRESHARED KEY |
| User-B | RANDOM NUMBER |
| User-C | PRESHARED KEY |

FIG. 9

| USER ID | PRESHARED KEY | TERMINAL GLOBAL IP | UDP | ESP |
|---------|---------------|--------------------|-----|-----|
| User-A  | PSKeyA        | G-IP-A             | 500 | 50(IPv4) |
| User-B  | PSKeyB        | G-IP-B             | 500 | 50(IPv6) |
| User-C  | PSKeyC        | G-IP-C             | 500 | 50(IPv4) |

FIG. 10

| USER ID | TERMINAL IP IN USE |
|---------|--------------------|
| User-A  | IP-A               |
| User-B  | IP-B               |
| User-C  | IP-C               |

| USER ID | DEVICE LIST |
|---|---|
| User-A | ALL |
| User-B | DeviceA, DeviceB |
| User-C | NONE |

| DEVICE NAME | IP | HTTP URL/UPnP URL |
|---|---|---|
| DeviceA | DEVICE IP_A | http://DEVICE IP_A |
| DeviceB | DEVICE IP_B | http://DEVICE IP_B |
| DeviceC | DEVICE IP_C | http://DEVICE IP_C |

| USER ID | PWD |
|---------|-----|
| User-A  | xx  |
| User-B  | yy  |
| User-C  | zz  |

FIG. 15

```
GET https://www.accessportal.com/menbers/... HTTP/1.1
Host: accessportal.com
User-Agent: xxx/yyy    Authorization:
Authorization Basic xxxxxxx
Credential homegw:gateway      ⎺⎺121
```

FIG. 18

```
INVITE sips:homegateway@carrier.net SIP/2.0
Via:SIP/2.0/TLS centerserver@carrier.net;branch=z9hG4bKxxxxxx
Max-Forwards:70
From: sips:centerserverl@carrier.net>;tag=xxxxxxx
To: sips:homegateway@carrier.net
Call-ID:xxx@carrier.net
CSeq:1 INVITE
Contact: sips:centerserver@carrier.net>
Content-Type:application/ sdp
Content-Length:yyy
-----------------------------------------
............
-----------------------------------------
USER ID                              ⎫
PRESHARED KEY                        ⎪
USER TERMINAL IP ADDRESS             ⎬ 122
IPv4 ESP PROTOCOL NUMBER (50)        ⎪
KEY EXCHANGE PORT NUMBER (UDP/500)   ⎭
```

FIG. 19

```
SIP/2.0 200 OK
Via: SIP/2.0/TLS centerserver@carrier.net;branch=z9hG4bkxxxxxx
From: sips:centerserver@carrier.net;tag=xxxxxx
To: sips:homegateway@carrier.net;tag=yyyyyy
Call-ID: xxx@carrier.net
CSeq: 1 INVITE
Contact: sips:homegateway@carrier.net
Content-Type: application/ sdp
Content-Length: yyy
```

FIG. 20

CONNECTION ASSISTANCE APPARATUS AND GATEWAY APPARATUS

CROSS-REFERENCE TO RELATED APPLICATIONS

This application is based upon and claims the benefits of priority from the prior Japanese Patent Application No. 2005-285983, filed on Sep. 30, 2005, the entire contents of which are incorporated herein by reference.

BACKGROUND OF THE INVENTION (1) Field of the Invention

The present invention relates to a connection assistance apparatus and a gateway apparatus, and more particularly to a connection assistance apparatus for assisting in connecting a terminal and a gateway apparatus for IPSec communications therebetween and a gateway apparatus for performing IPSec communications with a terminal.

(2) Description of the Related Art

In recent years, there have been used in the art remote access systems for connecting to a gateway apparatus of a home network or an intranet such as a LAN (Local Area Network) through a network such as the Internet or the like and controlling a device such as a digital home appliance or the like.

For example, a VPN (Virtual Private Network) is known as an example of secure remote access system on the Internet. The VPN is a technology for encrypting data flowing between a user terminal (client) for making remote access and a gateway apparatus (server) for accepting a connection from the user terminal to ensure that the data sent and received between the user terminal and the gateway apparatus cannot be intercepted by the third party.

Remote access can be achieved by either one of two solutions, i.e., an SSL (Secure Sockets Layer)—VPN for allowing the user to connect to a remote gateway apparatus according to HTTPS (Secure HTTP) and an IPSec (Security Architecture for the Internet Protocol)—VPN for allowing the user to connect to a remote gateway apparatus according to the IPSec. The IPSec—VPN will be described below.

FIG. 24 of the accompanying drawings is illustrative of an example of remote access according to the IPSec—VPN. As shown in FIG. 24, a user terminal 151 and a gateway apparatus 152 are connected to each other by a network such as the Internet, for example. A plurality of devices 153, 154, 155 are connected to the gateway apparatus 152. According to the IPSec—VPN, the user terminal 151 and the gateway apparatus 152 have respective preshared keys. If the preshared keys agree with each other, then the user terminal 151 and the gateway apparatus 152 exchange keys, and the user terminal 151 is allowed to make remote access to the gateway apparatus 152 according to the IPSec. The IPSec encrypts the user ID, the password, and the data to be sent and received between the user terminal 151 and the gateway apparatus 152 to prevent them from being intercepted by the third party during the transmission.

There has heretofore been proposed a data communication network system for allowing the user to connect to a plurality of provider communication networks for improved connectability, shorter communication routes, reduced communication quality deterioration, and cost reductions (see, for example, Japanese laid-open patent publication No. 2004-242161).

Since the gateway apparatus has its ports open at all times, it is exposed to DoS (Denial of Services) attacks and dictionary attacks, and has a possibility of suffering a significant performance degradation due to unauthorized access and DoS attacks.

For remote access to different domain areas, the user needs to be conscious of different IPSec access points, and needs to store preshared keys for the respective gateway apparatus of the access points, for example.

SUMMARY OF THE INVENTION

It is therefore an object of the present invention to provide a connection assistance apparatus which avoids unauthorized access and DoS attacks, prevents a performance degradation from occurring, and does not need to recognize different connections to gateway apparatus, and a gateway apparatus which avoids unauthorized access and DoS attacks and prevents a performance degradation from occurring.

To achieve the above object, there is provided in accordance with the present invention a connection assistance apparatus for assisting in connecting a terminal owned by a user and a gateway apparatus for IPSec communications therebetween. The connection assistance apparatus includes an authenticating unit for authenticating the validity of the user who owns the terminal, a preshared key generator for generating a preshared key for the terminal and the gateway apparatus based on the authenticated validity of the user, a firewall opening instruction information generator for generating firewall opening instruction information to open a firewall of the gateway apparatus based on the authenticated validity of the user, and a transmitting unit for sending the preshared key to the terminal and the gateway apparatus and sending the firewall opening instruction information to the gateway apparatus.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram showing an example of data stored in a user authentication management database managed by the connection assistance apparatus.

FIG. 7 is a diagram showing an example of data stored in a port management database managed by the connection assistance apparatus.

FIG. 8 is a diagram showing an example of data stored in a gateway apparatus management database managed by the connection assistance apparatus.

FIG. 9 is a diagram showing an example of data stored in a user session management database managed by the connection assistance apparatus.

FIG. 10 is a diagram showing an example of data stored in a firewall information management database managed by the gateway apparatus.

FIG. 11 is a diagram showing an example of data stored in a communicating user management database managed by the gateway apparatus.

FIG. 12 is a diagram showing an example of data stored in a device management database managed by the gateway apparatus.

FIG. 13 is a diagram showing an example of data stored in a device control profile database managed by the gateway apparatus.

FIG. 15 is a diagram showing an example of data stored in a user authentication management database managed by the gateway apparatus in the system shown in FIG. 14.

FIG. 18 is a diagram showing, by way of example, a message sent from the user terminal to the connection assistance apparatus.

FIG. 19 is a diagram showing, by way of example, a firewall control message sent from the connection assistance apparatus to the gateway apparatus.

FIG. 20 is a diagram showing, by way of example, a firewall control response message sent from the gateway apparatus to the connection assistance apparatus.

DESCRIPTION OF THE PREFERRED EMBODIMENTS

The principles of the present invention will be described in detail below with reference to FIG. 1.

Figure 1:
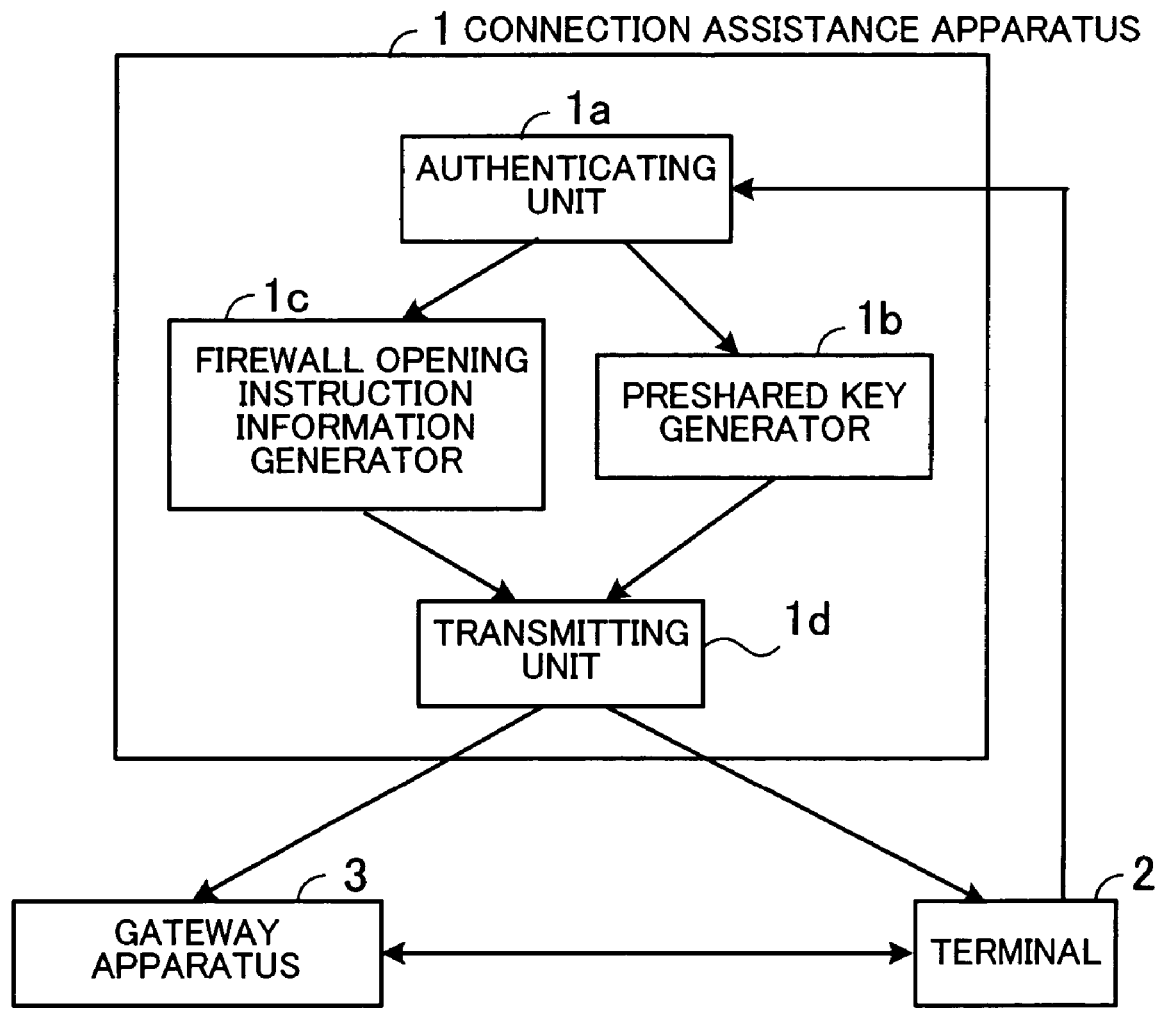
FIG. 1 is a block diagram of a general arrangement of a connection assistance apparatus.

FIG. 1 shows in block form a general arrangement of a connection assistance apparatus 1. As shown in FIG. 1, the connection assistance apparatus 1 is connected to a terminal 2 and a gateway apparatus 3 through a network, and assists in connecting the terminal 2 and the gateway apparatus 3 for IPSec communications. The connection assistance apparatus 1 has an authenticating unit 1a, a preshared key generator 1b, a firewall opening instruction information generator 1c, and a transmitting unit 1d.

The authenticating unit 1a authenticates the validity of the terminal 2 by checking if the terminal 1 is a valid terminal capable of communicating with the gateway apparatus 3 according to the IPSec.

If the authenticating unit 1a authenticates the validity of the terminal 2, then the preshared key generator 1b dynamically generates a preshared key for the terminal 2 and the gateway apparatus 3.

If the authenticating unit 1a authenticates the validity of the terminal 2, then the firewall opening instruction information generator 1c generates firewall opening instruction information for opening the firewall of the gateway apparatus 3.

The transmitting unit 1d sends the preshared key to the terminal 2 and the gateway apparatus 3, and also sends the firewall opening instruction information to the gateway apparatus 3.

Based on the preshared key, the terminal 2 and the gateway apparatus 3 generate a shared secret key and perform IPSec communications. The terminal 2 can perform direct IPSec communications with an electronic device, not shown, that is under the control of the gateway apparatus 3. The gateway apparatus 3 opens the ports for the terminal 2 based on the firewall opening instruction information.

As described above, the connection assistance apparatus 1 authenticates the validity of the terminal 2. If the terminal 2 is a valid terminal, then the connection assistance apparatus 1 generates a preshared key and firewall opening instruction information for enabling IPSec communications. The connection assistance apparatus 1 sends the preshared key to the terminal 2, and also sends the preshared key and the firewall opening instruction information to the gateway apparatus 3. The gateway apparatus 3 may open its ports for the terminal 2 when it receives the firewall opening instruction information. Therefore, the gateway apparatus 3 does not need to keep the ports open at all times, and hence can avoid unauthorized access and DoS attacks and prevent its performance from being degraded. Since the connection assistance apparatus 1 generates the preshared key, the terminal 2 is not required to store the preshared key for the gateway apparatus 3, and does not need to recognize different connections to the gateway apparatus 3.

A connection assistance apparatus according to a first embodiment of the present invention will be described in detail below.

Figure 2:
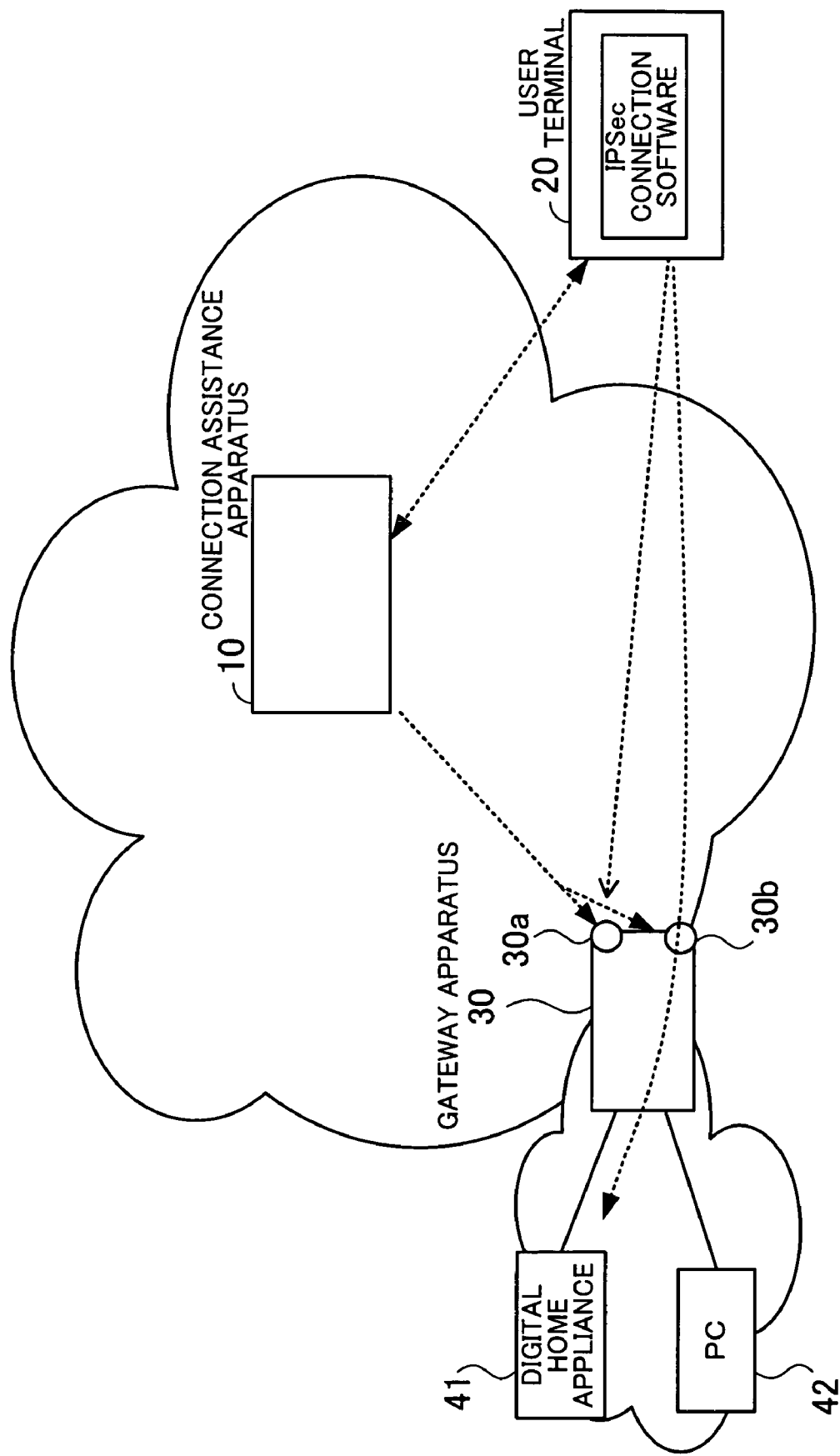
FIG. 2 is a block diagram of a system for IPSec remote access using a connection assistance apparatus according to a first embodiment of the present invention.

FIG. 2 shows in block form a system for IPSec remote access using the connection assistance apparatus according to the first embodiment of the present invention. As shown in FIG. 2, a user terminal 20 and a gateway apparatus 30 are connected to the connection assistance apparatus, indicated by 10, through a network such as the Internet or the like. The user terminal 20 comprises a cellular phone or a PC (Personal Computer), for example. A digital home appliance 41 and a PC 42 are connected to the gateway apparatus 30 as devices under the control of the gateway apparatus 30, through a home network such as a LAN or the like. The user terminal 20 stores a software application for making IPSec connections. According to the stored software application, the user terminal 20 exchanges data with the gateway apparatus 30, and also exchanges data with the digital home appliance 41 and the PC 42.

Though only one user terminal 20 and only one gateway apparatus 30 are shown in FIG. 2, a plurality of user terminals 20 and a plurality of gateway apparatus 30 may be connected to the connection assistance apparatus 10. The user terminal 20 is capable of accessing a plurality of gateway apparatus, and the gateway apparatus 30 is capable of being accessed from a plurality of user terminals.

Operation of the system shown in FIG. 2 will be described below. In order for the user to access the digital home appliance 41 and the PC 42 of the home network through the user terminal 20, the user terminal 2 first logs in the connection assistance apparatus 10. At this time, the user terminal 20 sends authentication information including a user ID and a password to the connection assistance apparatus 10 for logging in the connection assistance apparatus 10. The connection assistance apparatus 10 determines whether the user terminal 20 is a valid user terminal or not, based on the user ID and the password included in the authentication information.

If the connection assistance apparatus 10 judges that the login from the user terminal 20 is valid, then the connection assistance apparatus 10 sends information representing a list of gateway apparatus that the user terminal 20 can connect to, to the user terminal 20. The user terminal 20 displays the list of gateway apparatus sent from the connection assistance apparatus 10, on a display unit of the user terminal 20, for example. Then, the user terminal 20 accepts information from the user that indicates which of the displayed gateway apparatus the user terminal 20 is to connect to. The user terminal 20 sends information of the gateway apparatus selected by the user to the connection assistance apparatus 10. It is assumed here that the user has selected the gateway apparatus 30.

The connection assistance apparatus 10 sends a firewall control message to the gateway apparatus 30 so that the user terminal 20 can access the gateway apparatus 30. The firewall control message includes various items of information representing, for example, the identifier, the global IP address, and the preshared key for IPSec communications of the user terminal 20, an ESP (Encapsulating Security Payload) header number, and an IKE (Internet Key Exchange) port number. The connection assistance apparatus 10 dynamically generates a preshared key each time a request to access the gateway apparatus is sent from the user terminal 20.

When the gateway apparatus 30 receives the firewall control message, the gateway apparatus 30 manages the various information included in the firewall control message, and makes settings for permitting communications with respect to data including the source IP address (the global IP address of the user terminal 20), the IKE port number (UDP 500), and the ESP header number (50). Specifically, as shown in FIG. 2, the gateway apparatus 30 opens a key exchange port 30a thereof according to the IKE port number (UDP 500) and also opens a data communication port 30b thereof according to the ESP header (50), for allowing a key exchange and an IPSec data exchange with the user terminal 20. The gateway apparatus 30 may make settings for permitting communications with respect to data including an IP address generated by a mode configuration, to be described later.

After having sent the firewall control message to the gateway apparatus 30, the connection assistance apparatus 10 sends information including the same preshared key as the one sent to the gateway apparatus 30 and the IP address and URL of the gateway apparatus 30, to the user terminal 20.

When the user terminal 20 receives the preshared key 10 from the connection assistance apparatus 10, the user terminal 20 connects to the port 30a and establishes communications for a key exchange with the gateway apparatus 30. The user terminal 20 and the gateway apparatus 30 confirm whether their preshared keys agree with each other or not. If their preshared keys agree with each other, then the gateway apparatus 30 generates an IP address and a shared secret key for enabling IPSec communications. The user terminal 20 sends data to the port 30b of the gateway apparatus 30 for an IPSec data exchange with the gateway apparatus 30 or the digital home appliance 41 and the PC 42 under the control of the gateway apparatus 30. When there is a logout request from the user terminal 20, the gateway apparatus 30 closes the ports 30a, 30b through which it has communicated with the user terminal 20.

As described above, in response to a remote access request from the user terminal 20, the connection assistance apparatus 10 dynamically distributes a preshared key for enabling IPSec communications to the gateway apparatus 30 and the user terminal 20. The user terminal 20 can access the gateway apparatus 30 and the digital home appliance 41 and the PC 42 under the control of the gateway apparatus 30, using the distributed preshared key. Even if there are a plurality of gateway apparatus that are accessible from the user terminal 20, the user terminal 20 is not required to manage respective preshared keys of the individual gateway apparatus. Furthermore, until the gateway apparatus 30 receives a preshared key and a firewall control message from the connection assistance apparatus 10, the gateway apparatus 30 is not required to open its ports, and hence is protected from intercepting and DoS attacks.

Details of the connection assistance apparatus 10, the user terminal 20, and the gateway apparatus 30 shown in FIG. 2 will be described below.

Figure 3:
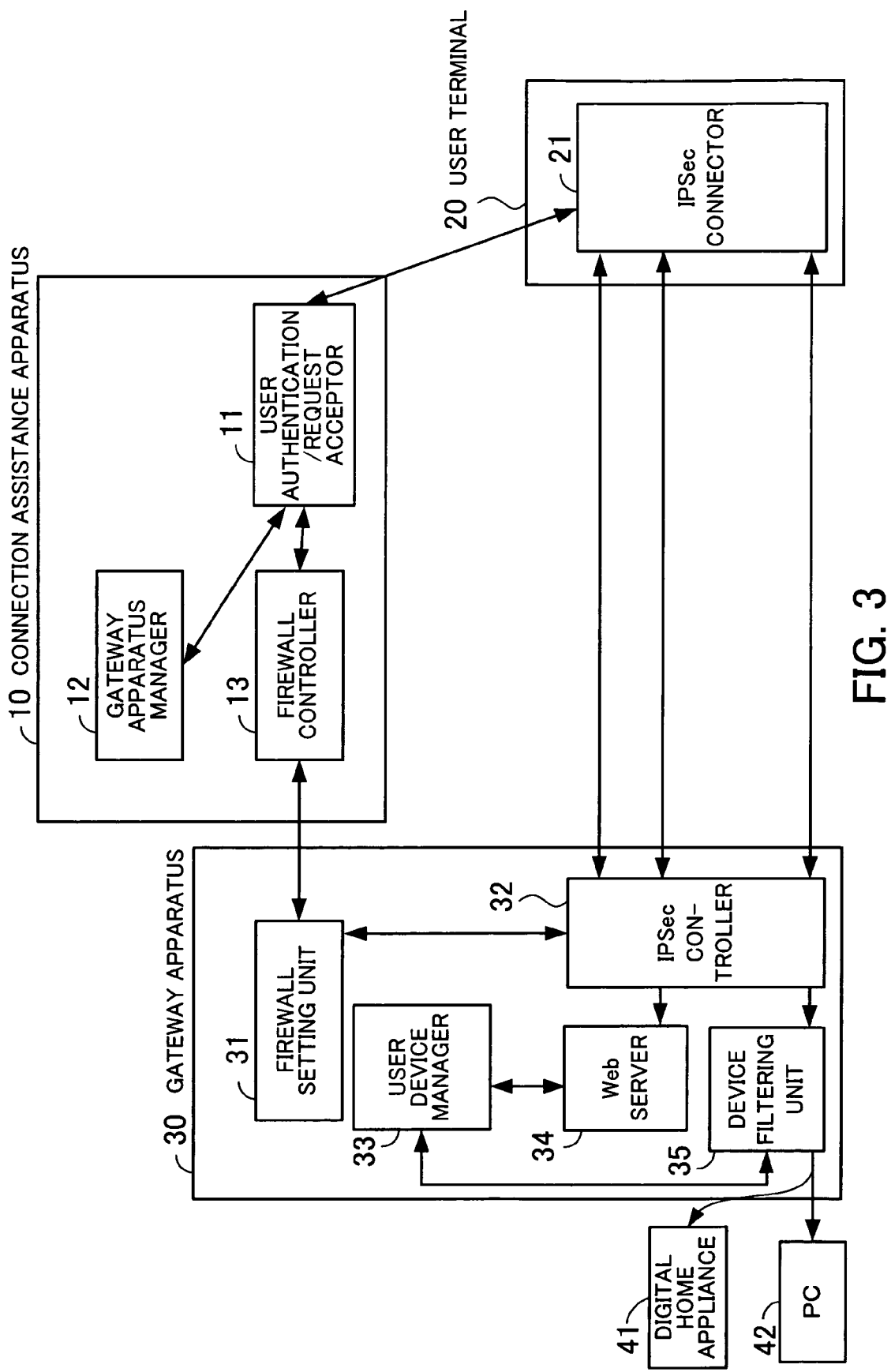
FIG. 3 is a functional block diagram of the system shown in FIG. 2.

FIG. 3 is a functional block diagram of the system shown in FIG. 2. As shown in FIG. 3, the connection assistance apparatus 10 has a user authentication/request acceptor 11, a gateway apparatus manager 12, and a firewall controller 13. The user terminal 20 has an IPSec connector 21. The gateway apparatus 30 has a firewall setting unit 31, an IPSec controller 32, a user device manager 33, a Web server 34, and a device filtering unit 35.

The user authentication/request acceptor 11 of the connection assistance apparatus 10 communicates with the user terminal 20. The user authentication/request acceptor 11 also authenticates the user terminal 2 which has accessed the connection assistance apparatus 10.

The gateway apparatus manager 12 manages information of the gateway apparatus 30 which the user terminal 20 can connect to. When the user authentication/request acceptor 11 authenticates the user terminal 2 which has accessed the connection assistance apparatus 10, the gateway apparatus manager 12 acquires information of the gateway apparatus 30 which the user terminal 20 can connect to. The information of the gateway apparatus 30 that is managed by the gateway apparatus manager 12 is sent through the user authentication/request acceptor 11 to the user terminal 20, and displayed as a list on the display unit of the user terminal 20.

The firewall controller 13 generates a firewall control message for allowing the user terminal 20 that has been authenticated to access the gateway apparatus 30. The firewall controller 13 sends the generated firewall control message to the gateway apparatus 30. When the firewall controller 13 receives a firewall response message, to be described later, from the gateway apparatus 30, the firewall controller 13 sends information including a preshared key and an IP address and URL of the gateway apparatus 30 which has been requested by the user to connect to, to the user terminal 20.

The firewall setting unit 31 of the gateway apparatus 30 receives the firewall control message from the connection assistance apparatus 10. According to the received firewall control message, the firewall setting unit 31 opens the key exchange port 30a and the data communication port 30b of the IPSec controller 32. In response to the firewall control message received from the connection assistance apparatus 10, the firewall setting unit 31 sends a firewall response message to the connection assistance apparatus 10.

The IPSec controller 32 opens the key exchange port 30a and the data communication port 30b under the control of the firewall setting unit 31. The user terminal 20 now can send key exchange data to the port 30a of the gateway apparatus 30. The user terminal 20 can also send data to the port 30b for communications with the gateway apparatus 30 and the digital home appliance 41 and the PC 42.

The user device manager 33 manages information of devices (the digital home appliance 41 and the PC 42) that can be accessed by the user terminal 20. The user device manager 33 retrieves information of devices that are accessible from the user terminal 20, and sends the retrieved information to the Web server 34 and the device filtering unit 35.

The Web server 34 accepts URL-based access from the user terminal 20, and sends link information of the devices that have been searched for by the user device manager 33 to the user terminal 20.

The device filtering unit 35 filters access from the user terminal 20 to the digital home appliance 41 and the PC 42. Based on the device information received from the user device manager 33, the device filtering unit 35 makes settings for permitting access from the user terminal 20 to the devices.

Formats of data packets used in communications between the user terminal 20 and the gateway apparatus 30 will be described below.

Figure 4A:
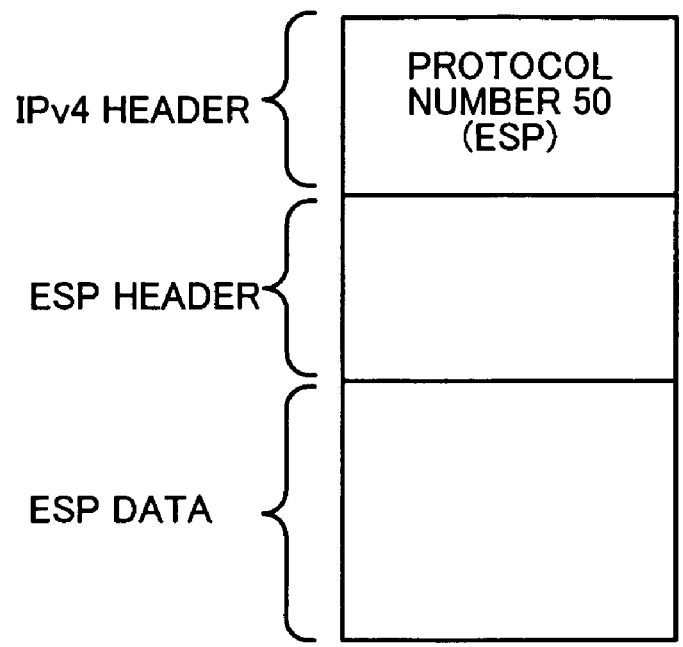
FIG. 4A is a diagram showing a format of a data packet to be transmitted between a user terminal and a gateway apparatus in the system shown in FIG. 2.
Figure 4B:
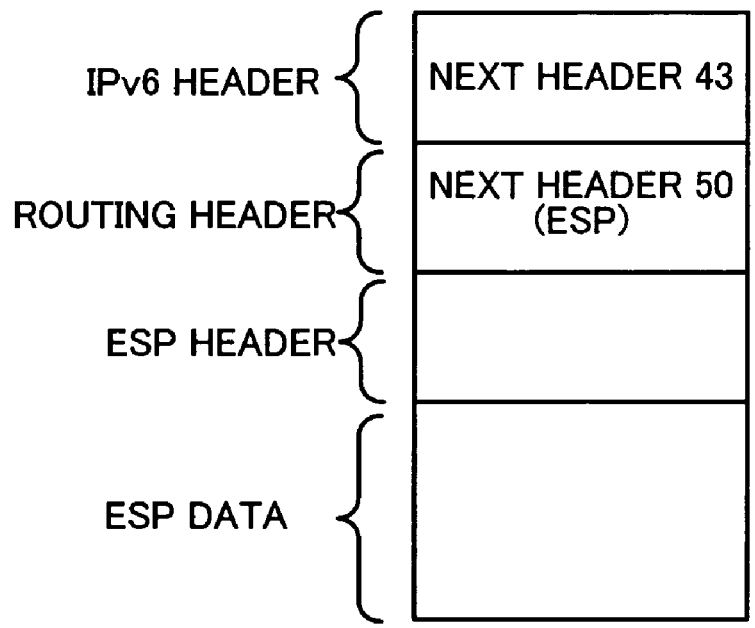
FIG. 4B is a diagram showing a format of another data packet to be transmitted between the user terminal and the gateway apparatus in the system shown in FIG. 2.

FIGS. 4A, 4B are diagram showing format of different data packets to be transmitted between the user terminal and the gateway apparatus. Specifically, FIG. 4A shows a format of a data packet according to IPv4, and FIG. 4B shows a format of a data packet according to IPv6.

As shown in FIG. 4A, the data packet according to IPv4 comprises an IPv4 header, an ESP header, and ESP data. The IPv4 header stores a protocol number 50 indicating that the data following the IPv4 header is ESP data. The gateway apparatus 30 shown in FIGS. 2 and 3 opens the data communication port 30b for data packets whose IPv4 headers store the protocol number 50 and data packets including various control information.

As shown in FIG. 4B, the data packet according to IPv6 comprises an IPv6 header, a routing header, an ESP header, and ESP data. The IPv6 header stores a number 43 indicating a header type following the IPv6 header. The routing header stores a protocol number 50 indicating that the data following the routing header is ESP data. The gateway apparatus 30 shown in FIGS. 2 and 3 opens the data communication port 30b for data packets whose routing headers store the protocol number 50 and data packets including various control information. Therefore, the connection assistance apparatus according to the present invention can be used with respect to data packets according to both IPv4 and IPv6.

IPSec communications will be described below.

Figure 5:
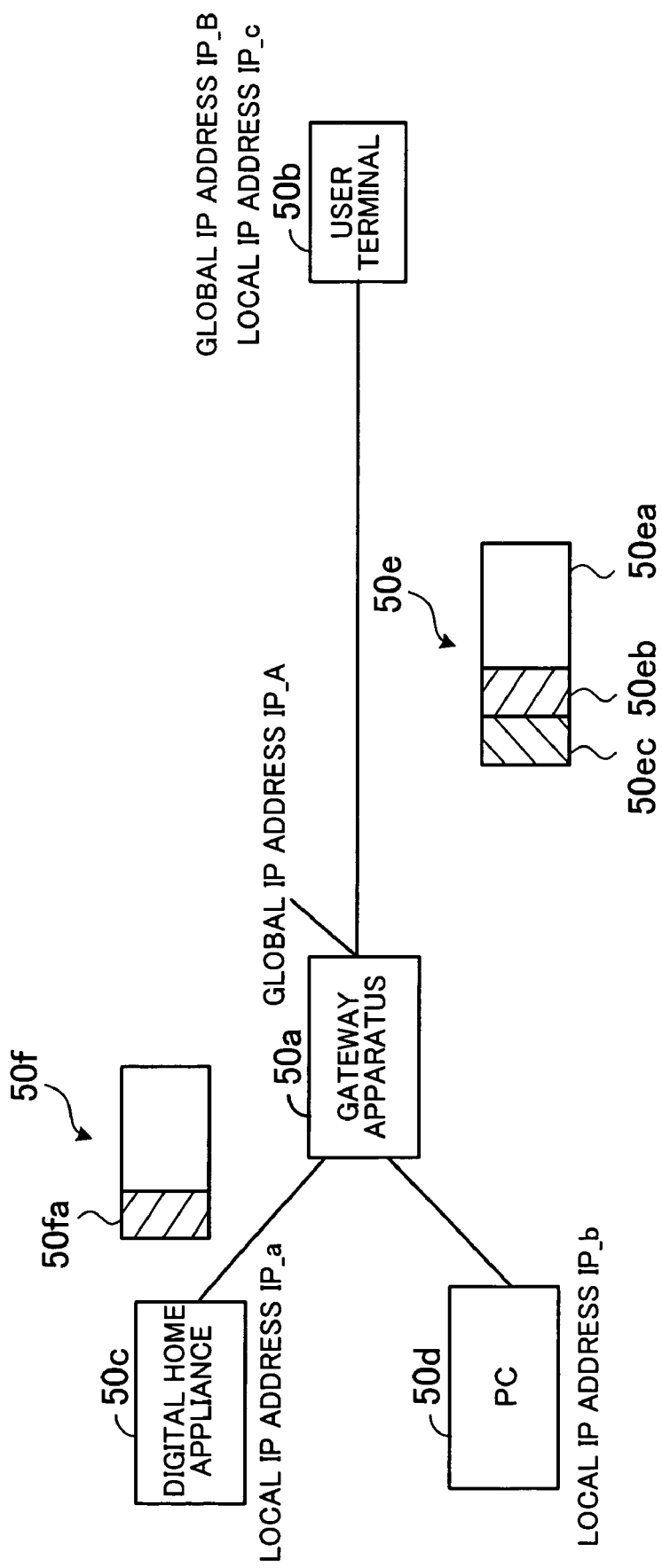
FIG. 5 is a block diagram illustrative of a process of IPSec communications.

FIG. 5 is illustrative of a process of IPSec communications. FIG. 5 shows a gateway apparatus 50a, a user terminal 50b, a digital home appliance 50c, and a PC 50d. It is assumed that the gateway apparatus 50a has a global IP address IP_A, the user terminal 50b has a global IP address IP_B, the digital home appliance 50c has a local IP address IP_a, and the PC 50d has a local IP address IP_b.

It is also assumed that the user terminal 50b is assigned a local IP address IP_c by the gateway apparatus 50a. For the user terminal 50b to send data to the digital home appliance 50c, the user terminal 50b stores the data to be sent to the digital home appliance 50c in a data area 50ea of a packet 50e shown in FIG. 5. The user terminal 50b stores the local IP address IP_a of the digital home appliance 50c and the local IP address IP_c of the user terminal 50b as the source in an inner IP header 50eb of the packet 50e. The user terminal 50b also stores the global IP address IP_A of the gateway apparatus 50a and the global IP address IP_B of the user terminal 50b as the source in an outer IP header 50ec of the packet 50e. The packet 50e is then sent from the user terminal 50b to the gateway terminal 50a.

When the gateway terminal 50a receives the packet 50e, the gateway terminal 50a removes the capsule (the outer header 50ec) of the packet 50e, as indicated by a packet 50f. The packet 50f is transmitted to the digital home appliance 50c according to an inner IP header 50fa of the packet 50f. In this manner, IPSec communications are performed between the user terminal 50b and the digital home appliance 50c.

Data managed by the connection assistance apparatus 10 will be described below.

Figure 6:
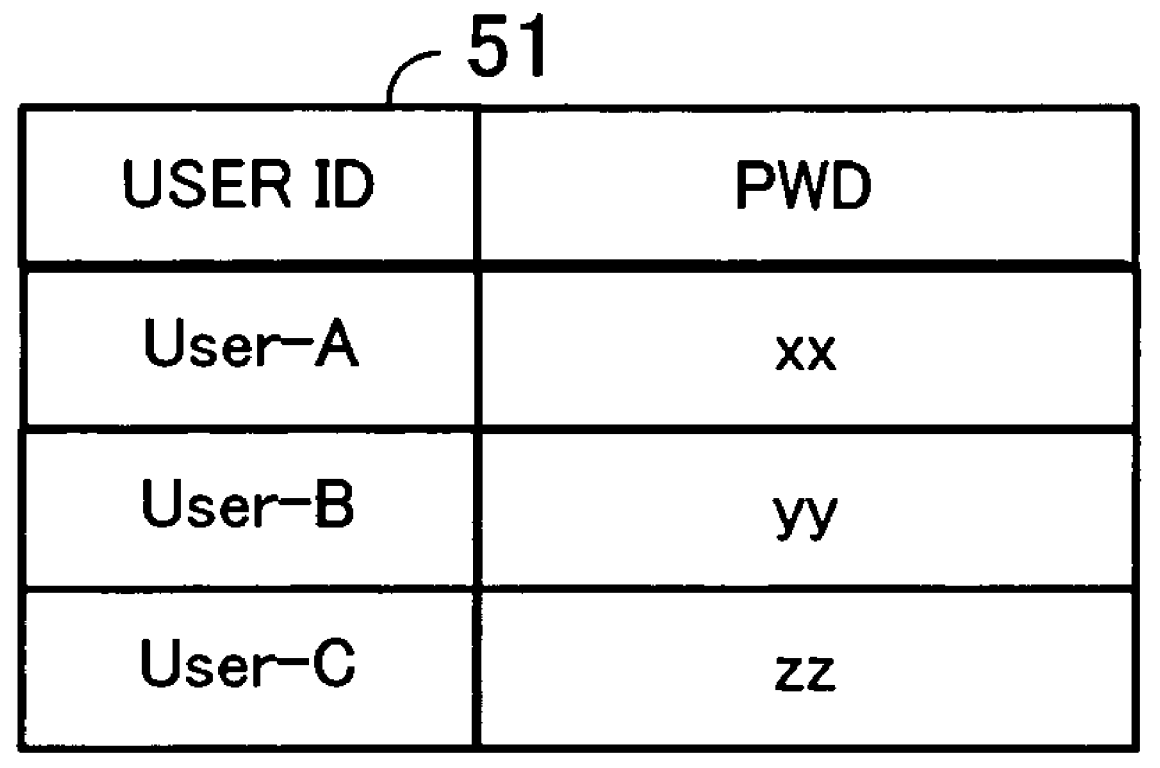

FIG. 6 shows an example of data stored in a user authentication management database managed by the connection assistance apparatus 10. As shown in FIG. 6, the connection assistance apparatus 10 has a user authentication management database 51. The user authentication management database 51 has a column of user IDs and a column of PWDs (passwords).

The column of user IDs stores the user IDs of user terminals that can access the gateway apparatus. The column of PWDs stores passwords that have been distributed to users. The user authentication/request acceptor 11 shown in FIG. 3 refers to the user authentication management database 51 and authenticates a user terminal that has logged in the connection assistance apparatus 10. The user authentication management database 51 is generated, for example, when a user makes a contract to receive remote access services according to the IPSec from the connection assistance apparatus 10.

FIG. 7 shows an example of data stored in a port management database managed by the connection assistance apparatus 10. As shown in FIG. 7, the connection assistance apparatus 10 has a port management database 52. The port management database 52 has a column of user IDs, a column of protocols, and a column of ports.

The column of user IDs stores the user IDs of user terminals that can access the gateway apparatus. The column of protocols stores information of protocols for performing a data exchange between the gateway apparatus and the user terminals. The column of ports stores information of the types of ports to be opened by the gateway apparatus 30 for communications with the user terminals. The port management database 52 is of a static nature, and is generated, for example, when a user makes a contract to receive remote access services according to the IPSec from the connection assistance apparatus 10.

FIG. 8 shows an example of data stored in a gateway apparatus management database managed by the connection assistance apparatus 10. As shown in FIG. 8, the connection assistance apparatus 10 has a gateway apparatus management database 53. The gateway apparatus management database 53 has a column of gateway IDs (GW_ID) and a column of gateway IPs (GW_IP).

The column of gateway IDs stores identifiers allocated to gateway apparatus. The column of gateway IPs stores the IP addresses of gateway apparatus. The gateway apparatus management database 53 is managed by the gateway apparatus manager 12 shown in FIG. 3. The gateway apparatus management database 53 is sent through the user authentication/request acceptor 11 to the user terminal 20, and displayed as a list on the display unit of the user terminal 20. The gateway apparatus management database 53 is generated, for example, when a gateway apparatus makes a contract to receive remote access services according to the IPSec from the connection assistance apparatus 10.

FIG. 9 shows an example of data stored in a user session management database managed by the connection assistance apparatus 10. As shown in FIG. 9, the connection assistance apparatus 10 has a user session management database 54. The user session management database 54 has a column of user IDs and a column of session IDs.

The column of user IDs stores the user IDs of user terminals that are accessing the gateway apparatus. The column of session IDs stores details of sessions between user terminals and the gateway apparatus. The user session management database 54 is dynamic in nature, and the session IDs stored therein vary depending on the details of sessions between user terminals and the gateway apparatus.

Data managed by the gateway apparatus 30 will be described below.

FIG. 10 shows an example of data stored in a firewall information management database managed by the gateway apparatus 30. As shown in FIG. 10, the gateway apparatus 30 has a firewall information management database 61. The firewall information management database 61 has a column of user IDs, a column of preshared keys, a column of terminal global IPs, a column of UDPs, and a column of ESPs.

The column of user IDs stores the user IDs of user terminals that can access the gateway apparatus 30. The column of preshared keys stores preshared keys that have been generated by the connection assistance apparatus 10. The column of terminal global IPs stores the global IP addresses of user terminals. The column of UDPs stores UDP port numbers (500). The column of ESPs stores ESP header numbers (50) and IP protocol version information.

The firewall information management database 61 is generated based on a firewall control message sent from the connection assistance apparatus 10. When a user terminal logs out of the gateway apparatus 30, firewall information with respect to the user terminal is deleted from the firewall information management database 61.

FIG. 11 shows an example of data stored in a communicating user management database managed by the gateway apparatus 30. As shown in FIG. 11, the gateway apparatus 30 has a communicating user management database 62. The communicating user management database 62 has a column of user IDs and a column of terminal IPs in use.

The column of user IDs stores the user IDs of user terminals that can access the gateway apparatus 30. The column of terminal IPs in use stores IP addresses that are distributed from the gateway apparatus 30 to user terminals that makes remote access to the gateway apparatus 30. Such an IP address is generated by the gateway apparatus 30 when the preshared keys of the gate apparatus 30 and the accessing user terminal 20 agree with each other.

FIG. 12 shows an example of data stored in a device management database managed by the gateway apparatus 30. As shown in FIG. 12, the gateway apparatus 30 has a device management database 63. The device management database 63 has a column of user IDs and a column of device lists.

The column of user IDs stores the user IDs of user terminals that can access the gateway apparatus 30. The column of device lists stores information of devices that user terminals can access.

FIG. 13 shows an example of data stored in a device control profile database managed by the gateway apparatus 30. As shown in FIG. 13, the gateway apparatus 30 has a device control profile database 64. The device control profile database 64 has a column of device names, a column of IPs, and a column of HTTP URLs/UPnP URLs.

The column of device names stores the names of devices connected to the gateway apparatus 30. The column of IPs stores the IP addresses of devices. The column of HTTP URLs/UPnP URLs stores HTTP URLs and UPnP URLs for accessing devices.

The device control profile database 64 is managed by the Web server 34. When the user terminal 20 accesses the Web server 34 according to the URL thereof, link information of devices based on the device control profile database 64 is sent to the user terminal 20. The user terminal 20 displays on its display unit the device names stored in the device control profile database 64. Links to the HTTP URLs and UPnP URLs stored in the device control profile database 64 are added to the displayed device names.

The device management database 63 shown in FIG. 12 is managed by the user device manager 33 shown in FIG. 3. The user device manager 33 retrieves information of devices that can be accessed by user terminals from the device management database 63, and sends the retrieved information to the Web server 34 and the device filtering unit 35. The device filtering unit 35 refers to the communicating user management database 62, acquires the user ID of a user terminal that is currently communicating with the gateway apparatus 30, and limits access to devices by the communicating user terminal based on the information of devices that can be accessed by the user terminal which has been sent from the user device manager 33. The Web server 34 refers to the device control profile database 64 shown in FIG. 13, and sends information of devices that can be accessed by user terminals to the user terminals.

As described above, the connection assistance apparatus 10 authenticates the validity of the user terminal 20. If the user terminal 20 is a valid terminal, then the connection assistance apparatus 10 generates a preshared key and a firewall control message for enabling IPSec communications. The connection assistance apparatus 10 sends the preshared key to the user terminal 20 and the gateway apparatus 30, and also sends the firewall control message to the gateway apparatus 30. The gateway apparatus 30 receives the preshared key and then opens its ports for the user terminal 20. Therefore, the gateway apparatus 30 does not need to keep the ports open at all times, and hence can avoid unauthorized access and DoS attacks and prevent its performance from being degraded. Since the connection assistance apparatus 10 generates the preshared key, the user terminal 20 is not required to store the preshared key for the gateway apparatus 30, and does not need to recognize different connections to the gateway apparatus 30.

In addition, filtering for permitting the user terminal 20 to access devices can prevent the third party's interrupting.

A connection assistance apparatus according to a second embodiment of the present invention will be described in detail below. According to the second embodiment, the connection assistance apparatus adds the user ID and the password of a user who has logged in to a firewall control message, and then sends the firewall. control message to the gateway apparatus. When the gateway apparatus determines whether the preshared key of the user terminal and the preshared key of the gateway apparatus agree with each other or not, the gateway apparatus receives the user ID and the password from the user terminal, and authenticates the user ID and the password added to the firewall control message against the user ID and the password that have been received from the user terminal. In this manner, the gateway apparatus thus prevents the third party from connecting to the devices in advance.

Figure 14:
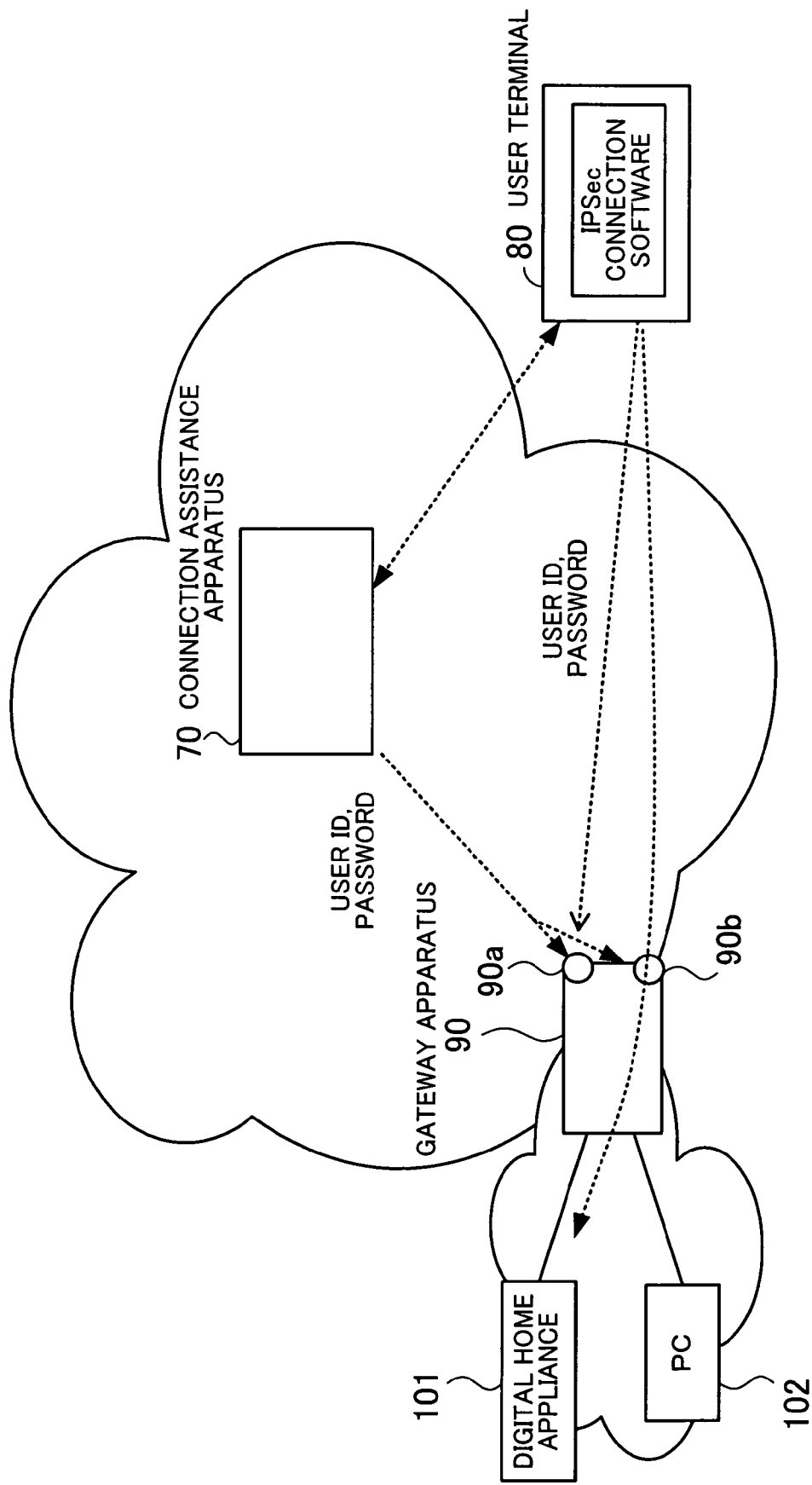
FIG. 14 is a block diagram of a system for IPSec remote access using a connection assistance apparatus according to a second embodiment of the present invention.

FIG. 14 shows in block form a system for IPSec remote access using the connection assistance apparatus according to the second embodiment of the present invention. As shown in FIG. 14, a user terminal 80 and a gateway apparatus 90 are connected to the connection assistance apparatus, indicated by 70, through a network such as the Internet or the like. A digital home appliance 101 and a PC 102 are connected to the gateway apparatus 90 as devices under the control of the gateway apparatus 90, through a home network such as a LAN or the like. The user terminal 80 stores a software application for making IPSec connections. According to the stored software application, the user terminal 80 exchanges data with the gateway apparatus 90, and also exchanges data with the digital home appliance 101 and the PC 102.

Though only one user terminal 80 and only one gateway apparatus 90 are shown in FIG. 14, a plurality of user terminals 80 and a plurality of gateway apparatus 90 may be connected to the connection assistance apparatus 70. The user terminal 80 is capable of accessing a plurality of gateway apparatus, and the gateway apparatus 90 is capable of being accessed from a plurality of user terminals.

Operation of the system shown in FIG. 14 will be described below with respect to only details which are different from those of the system shown in FIG. 2. Other details of operation of the system shown in FIG. 14 are identical to those of the system shown in FIG. 2.

The connection assistance apparatus 70 sends a firewall control message to the gateway apparatus 90 for allowing the user terminal 80 to access the gateway apparatus 90 which has been selected by the user terminal 80. The firewall control message includes the user ID and the password of the user terminal 80 in addition to the information described above with respect to FIG. 2.

In order to authenticate the preshared key of the user terminal 80, the gateway apparatus 90 opens a key exchange port 90a thereof. The gateway apparatus 90 authenticates the preshared key of the user terminal 80 through the port 90a, receives the user ID and the password from the user terminal 80, and checks the user ID and the password that have been received from the user terminal 80 against the user ID and the password which are included in the firewall control message that has been received from the connection assistance apparatus 70. If the user IDs and the passwords agree with each other, then the gateway apparatus 90 permits data to be exchanged between itself and the user terminal 80 through an IPSec port 90b thereof. When the gateway apparatus 90 thus authenticates the user ID and the password from the user terminal 80, the gateway apparatus 90 is more effective to prevent the third party from intercepting data transmitted between the user terminal 80 and the gateway apparatus 90.

For authenticating user IDs and passwords, the gateway apparatus 90 has a user authentication management database.

Figure 15:
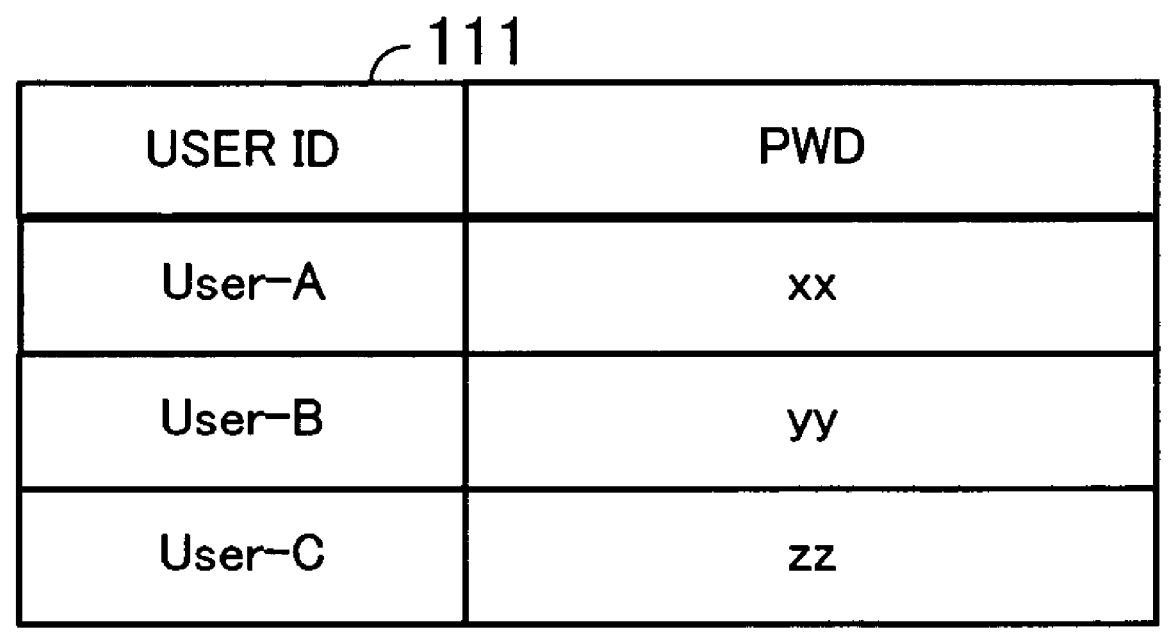

FIG. 15 shows an example of data stored in a user authentication management database managed by the gateway apparatus 90. As shown in FIG. 15, the gateway apparatus 90 has a user authentication management database 111. The user authentication management database 111 has a column of user IDs and a column of PWDs (passwords). The user authentication management database 111 is generated when the firewall setting unit 31 shown in FIG. 3 receives a firewall control message. The IPSec controller 32 shown in FIG. 3 authenticates the user ID and the password that are sent from the user terminal 80.

Operation of the system shown in FIG. 14 will be described below with reference to sequence diagrams.

Figure 16:
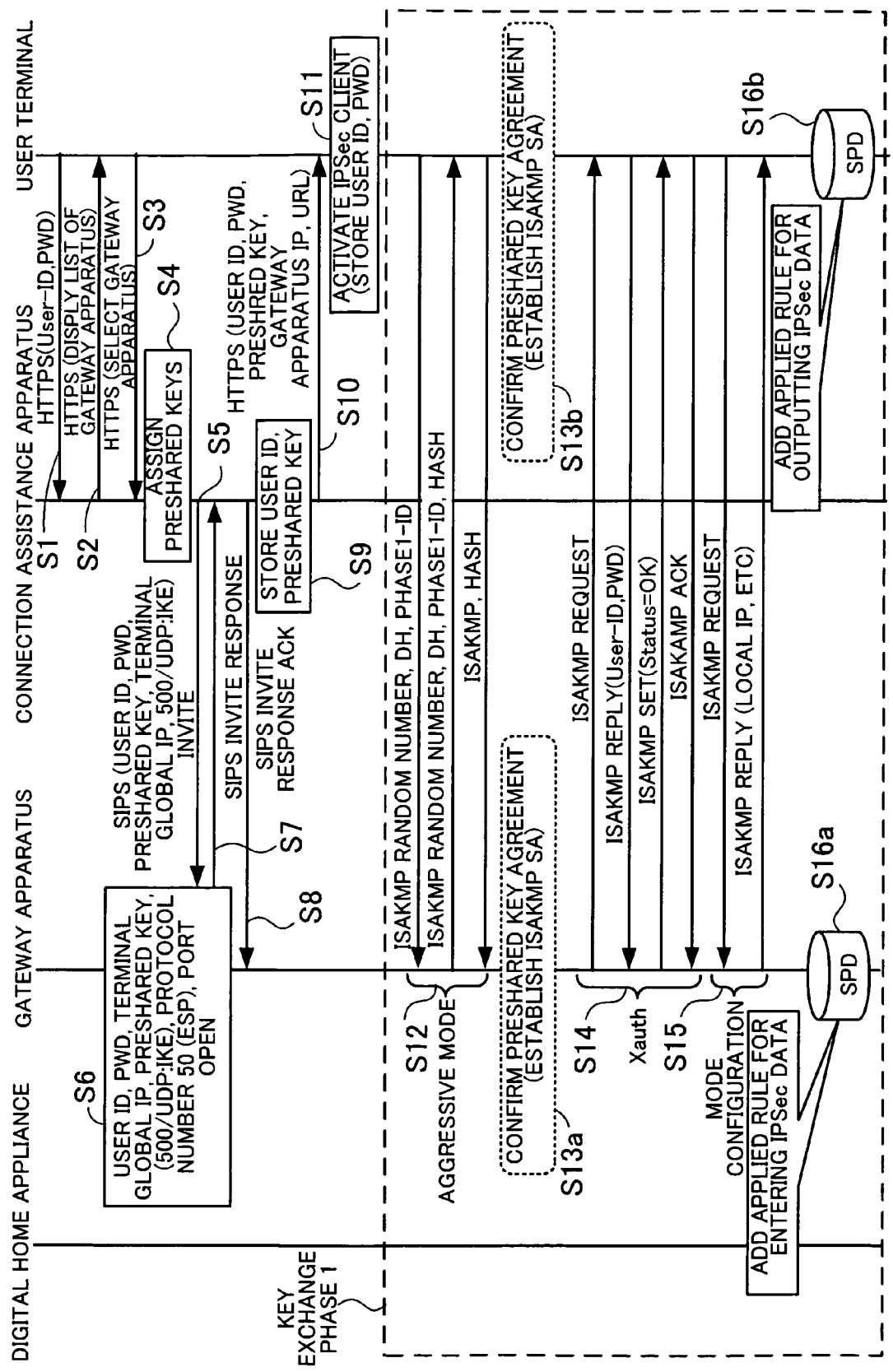
FIG. 16 is a sequence diagram of the system shown in FIG. 14.
Figure 17:
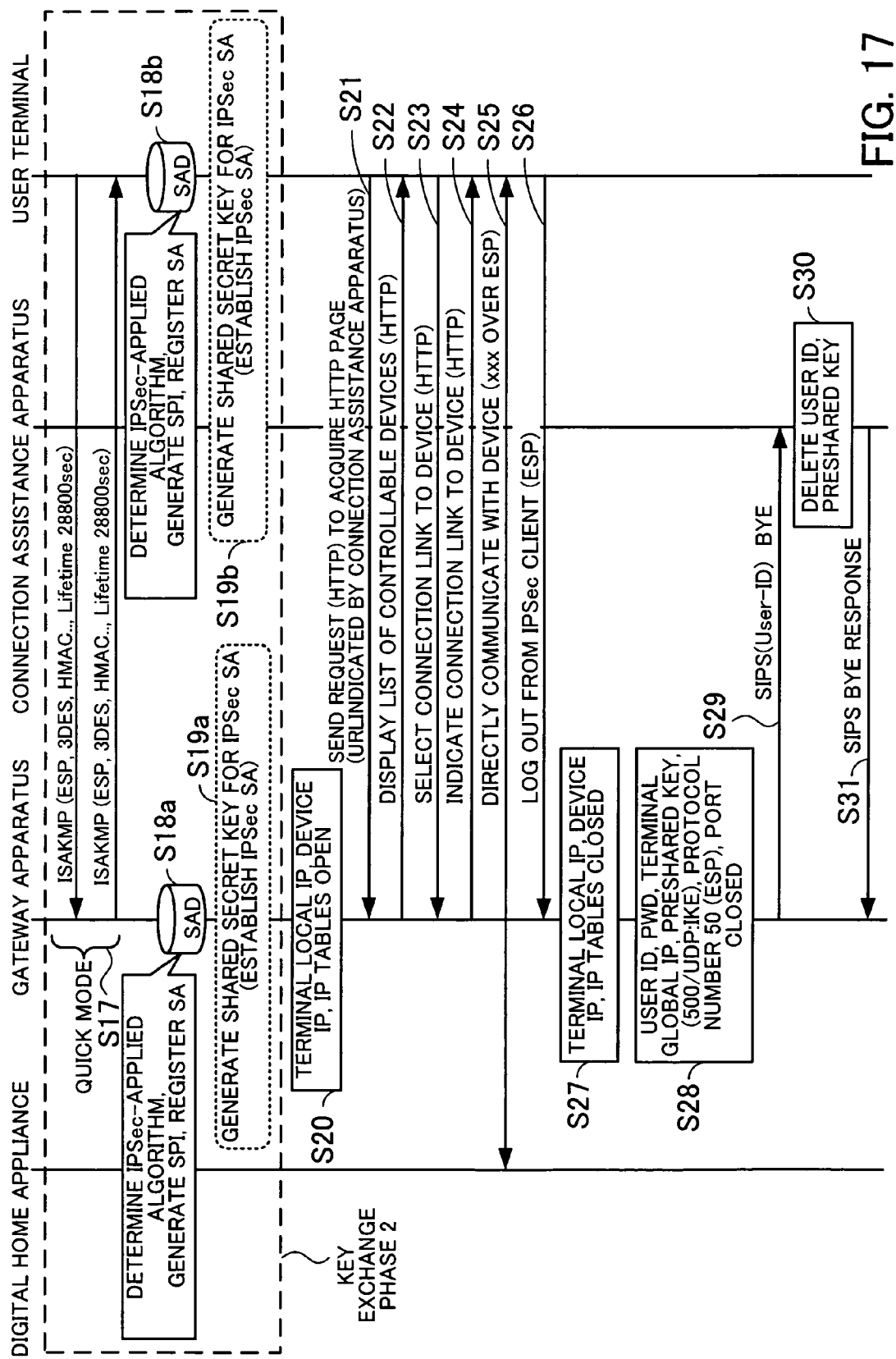
FIG. 17 is a sequence diagram of the system shown in FIG. 14.

FIGS. 16 and 17 are sequence diagrams of the system shown in FIG. 14. The connection assistance apparatus 70, the user terminal 80, the gateway apparatus 90, the digital home appliance 101, and the PC 102 perform IPSec remote access according to the steps described below. Throughout the sequence, the connection assistance apparatus 70 and the user terminal 80 communicate with each other according to the HTTPS, and the connection assistance apparatus 70 and the gateway apparatus 90 communicate with each other according to SIPS (Session Initiation Protocol Security).

For the user terminal 80 to log in the connection assistance apparatus 70, the user terminal 80 sends a message including the user ID and the password to the connection assistance apparatus 70 in step S1. If the connection assistance apparatus 70 judges that the login is valid using the user ID and the password of the user terminal 80, then the connection assistance apparatus 70 sends a list of gateway apparatus that the user terminal 80 can connect to, to the user terminal 80 in step S2. The user terminal 80 displays the list of gateway apparatus sent from the connection assistance apparatus 70 on the display unit of the user terminal 80, and accepts information from the user that indicates which of the displayed gateway apparatus the user terminal 20 is to connect to. The user terminal 80 sends information of the gateway apparatus selected by the user to the connection assistance apparatus 70 in step S3. It is assumed here that the user has selected the gateway apparatus 90.

The connection assistance apparatus 70 dynamically assigns a preshared key to the user terminal 80 and the gateway apparatus 90 so that the user terminal 80 and the gateway apparatus 90 can perform encrypted communications according to the IPSec in step S4. The connection assistance apparatus 70 generates a firewall control message including the user ID, the password, the global IP address, and the preshared key of the user terminal 80, the ESP header number (50), and the IKE port number (500), and sends the generated firewall control message to the gateway apparatus 90 in step S5.

When the gateway apparatus 90 receives the firewall control message from the connection assistance apparatus 70, the gateway apparatus 90 generates the firewall information management database 61 shown in FIG. 10 and the user authentication management database 111 shown in FIG. 15, and manages the information stored in these databases in step S6. The gateway apparatus 90 returns an INVITE response of SIPS to the connection assistance apparatus 70 in step S7. When the connection assistance apparatus 70 receives the INVITE response from the gateway apparatus 90, the connection assistance apparatus 70 returns an ACK signal to the gateway apparatus 90 in step S8.

The connection assistance apparatus 70 stores the user ID and the preshared key of the user terminal 80 which has logged in the connection assistance apparatus 70, in the user session management database 54 in step S9. The connection assistance apparatus 70 sends the preshared key, the user ID and the password of the user terminal 80 which has logged in the connection assistance apparatus 70, and the IP address and the URL of the gateway apparatus 90 to the user terminal 80 in step S10. The user terminal 80 activates an IPSec client for performing encrypted communications according to the IPSec, and stores the user ID and the password in step S11. If the user terminal 80 stores the user ID and the password when it sends them in step S1, then the user terminal 80 is not required to store them in step S11.

The user terminal 80 and the gateway apparatus 90 now perform a key exchange process of Phase 1 which is indicated by the dotted-line frame in FIG. 16. The user terminal 80 and the gateway apparatus 90 enter an aggressive mode of operation to determine whether the preshared keys assigned by the connection assistance apparatus 70 agree with each other or not in step S12.

If it is confirmed that the preshared keys agree with each other, the user terminal 80 and the gateway apparatus 90 perform a user authentication (Xauth) process in step S14. In the user authentication process, the user terminal 80 sends the user ID and the password to the gateway apparatus 90. The gateway apparatus 90 checks the user ID and the password which have been sent from the user terminal 80 against the user ID and the password of the user terminal 80 that are included in the firewall control message. If the user IDs and the passwords agree with each other, then it is judged that the user terminal 80 which has accessed the gateway apparatus 90 is a valid user terminal.

The user terminal 80 and the gateway apparatus 90 then perform a mode configuration process in step S15. In response to a request from the user terminal 80, the gateway apparatus 90 assigns an IP address to the user terminal 80. The assigned IP address is stored in the communicating user management database 62 shown in FIG. 11. The gateway apparatus 90 adds an applied rule for entering data encrypted according to the IPSec to an SPD (Security Policy Database) in step S16a. The user terminal 80 adds an applied rule for outputting data encrypted according to the IPSec to an SPD in step S16b.

The user terminal 80 and the gateway apparatus 90 then perform a key exchange process of Phase 2 which is indicated by the dotted-line frame in FIG. 17. The user terminal 80 and the gateway apparatus 90 enter a quick mode of operation to determine the expiration date of a shared secret key, which is generated as described below, in step S17.

The gateway apparatus 90 determines an IPSec-applied algorithm, generates an SPI (Security Policy Index), and registers an SA (Security Association) in an SAD (Security Association Database) in step 18a. Similarly, the user terminal 80 determines an IPSec-applied algorithm, generates an SPI, and registers an SA in an SAD in step 18b. The user terminal 80 and the gateway apparatus 90 generate a shared secret key in steps S19a, S19b.

The gateway apparatus 90 activates a device filtering function to permit the user terminal 80 to access only appropriate devices, i.e., the digital home appliance 101 and the PC 102, in step S20.

The user terminal 80 requests an HTTP page of the gateway apparatus 90 based on the URL sent from the connection assistance apparatus 70 in step S21. In response to the request from the user terminal 80, the gateway apparatus 90 sends a list of devices to the user terminal 80 so that the user terminal 80 displays the list of devices on its display unit in step S22. The user terminal 80 accepts information from the user that indicates which of the displayed devices the user terminal 20 is to access, and sends information of the selected device to the gateway apparatus 90 in step S23. The gateway apparatus 90 sends an address at which the user terminal 80 can connect to the selected device, to the user terminal 80 in step S24. The user terminal 80 then directly communicates with the selected device in step S25. When an exchange of necessary data between the user terminal 80 and the device is finished, the user terminal 80 logs out in step S26. In steps S21 through S26, the user terminal 80, the gateway apparatus 90, and the device perform IPSec communications through the data communication port 30b.

When the user terminal 80 logs out of the gateway apparatus 90, the gateway apparatus 90 deletes information as to the device filtering function for the user terminal 80 from the database in step S27. The gateway apparatus 90 deletes the information of the user ID, the password, the global IP address, and the preshared key of the user terminal 80, and closes the port in step S28.

In order to cancel the session with the connection assistance apparatus 70, the gateway apparatus 90 sends a BYE message including the user ID of the user terminal 80 with which the gateway apparatus 90 has communicated so far, to the connection assistance apparatus 70 in step S29. The connection assistance apparatus 70 deletes the user ID received from the gateway apparatus 90 and the preshared key corresponding to the user ID, from the database in step S30. The connection assistance apparatus 70 sends a response message in response to the BYE message to the gateway apparatus 90 in step S31.

The message that is sent from the user terminal 80 to the connection assistance apparatus 70 in step S1 shown in FIG. 16, the firewall control message that is sent from the connection assistance apparatus 70 to the gateway apparatus 90 in step S5 shown in FIG. 16, and the firewall control response message (INVITE response) that is sent from the gateway apparatus 90 to the connection assistance apparatus 70 in step S7 shown in FIG. 16 will be described below.

FIG. 18 shows, by way of example, a message sent from the user terminal 80 to the connection assistance apparatus 70. In step S1 shown in FIG. 16, the message shown in FIG. 18 is sent from the user terminal 80 to the connection assistance apparatus 70. The user ID and the password of the user terminal 80 are included in an area indicated by an underline 121 shown in FIG. 18.

FIG. 19 shows, by way of example, a firewall control message sent from the connection assistance apparatus 70 to the gateway apparatus 90. In step S5 shown in FIG. 16, the firewall control message shown in FIG. 19 is sent from the connection assistance apparatus 70 to the gateway apparatus 90. The user ID, the preshared key, the global IP address of the user terminal 80, the ESP protocol number (50), and the IKE port number (500) are included in an area indicated by 122 shown in FIG. 19.

FIG. 20 shows, by way of example, a firewall control response message sent from the gateway apparatus 90 to the connection assistance apparatus 70. In step S7 shown in FIG. 16, a 200 OK message shown in FIG. 20, which indicates the reception of a firewall control message, is sent as a firewall control response message sent from the gateway apparatus 90 to the connection assistance apparatus 70.

As described above, the connection assistance apparatus 70 sends the user ID and the password of the user terminal 80 to the gateway apparatus 90. When the gateway apparatus 90 opens the firewall for the user terminal 80, the gateway apparatus 90 receives the user ID and the password from the user terminal 80, and authenticates the user ID and the password that are received. In this manner, the gateway apparatus 90 is more effectively capable of preventing the third party from intercepting data transmitted between the user terminal 80 and the gateway apparatus 90.

A connection assistance apparatus according to a third embodiment of the present invention will be described in detail below. According to the first and second embodiments, the user terminal and the gateway apparatus perform remote access according to the IPSec only. According to the third embodiment, the connection assistance apparatus lets the user select either remote access according to the IPSec or remote access according to the HTTPS, and displays a list of gateway apparatus compatible with the selected remote access on the display unit of the user terminal. Then, the connection assistance apparatus permits the user terminal to communicate with one of the gateway apparatus which is selected by the user.

Figure 21:
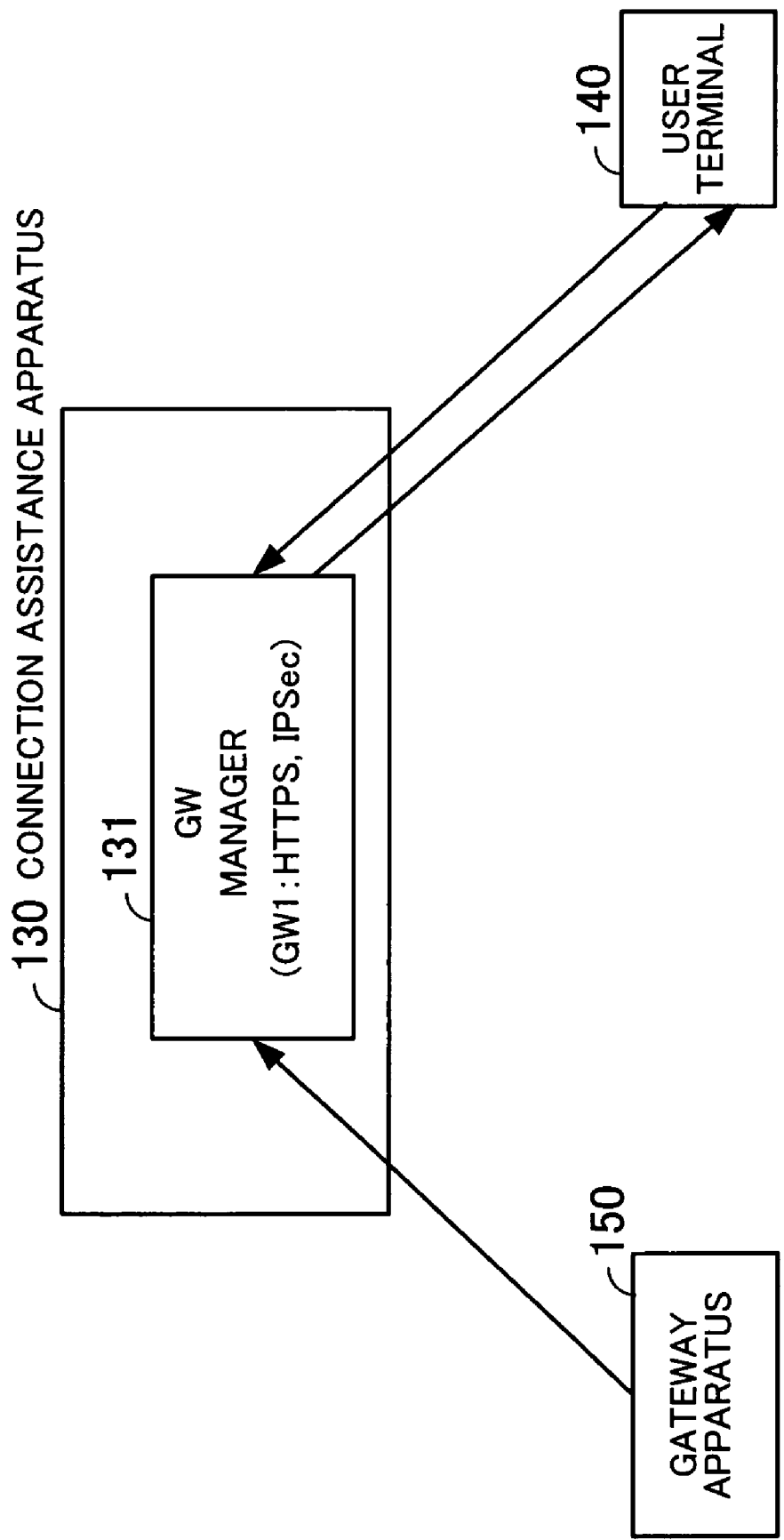
FIG. 21 is a block diagram of a system for performing protocol management by a gateway apparatus.

FIG. 21 shows in block form a system for performing protocol management by a gateway apparatus. The system shown in FIG. 21 includes a connection assistance apparatus 130, a user terminal 140, and a gateway apparatus 150. Only those details of the system shown in FIG. 21 which are different from those of the systems according to the first and second embodiments will be described below.

The gateway apparatus 150 indicates the type of a protocol according to which the gateway apparatus 150 is to communicate with the user terminal 140, to the connection assistance apparatus 130. The gateway apparatus 150 indicates the type of a protocol to the connection assistance apparatus 130 when the gateway apparatus 150 starts services of remote access through the connection assistance apparatus 130, for example. The connection assistance apparatus 130 has a GW manager 131 which manages the identifier of the gateway apparatus 150 and the protocol type. In response to a request from the user terminal 140, the GW manager 131 displays the identifier of the gateway apparatus 150 and the protocol type on the display unit of the user terminal 140. The connection assistance apparatus 130 thus displays a remote access unit depending on the corresponding protocol of the gateway apparatus 150.

Operation of the system shown in FIG. 21 will be described below with reference to a sequence diagram.

Figure 22:
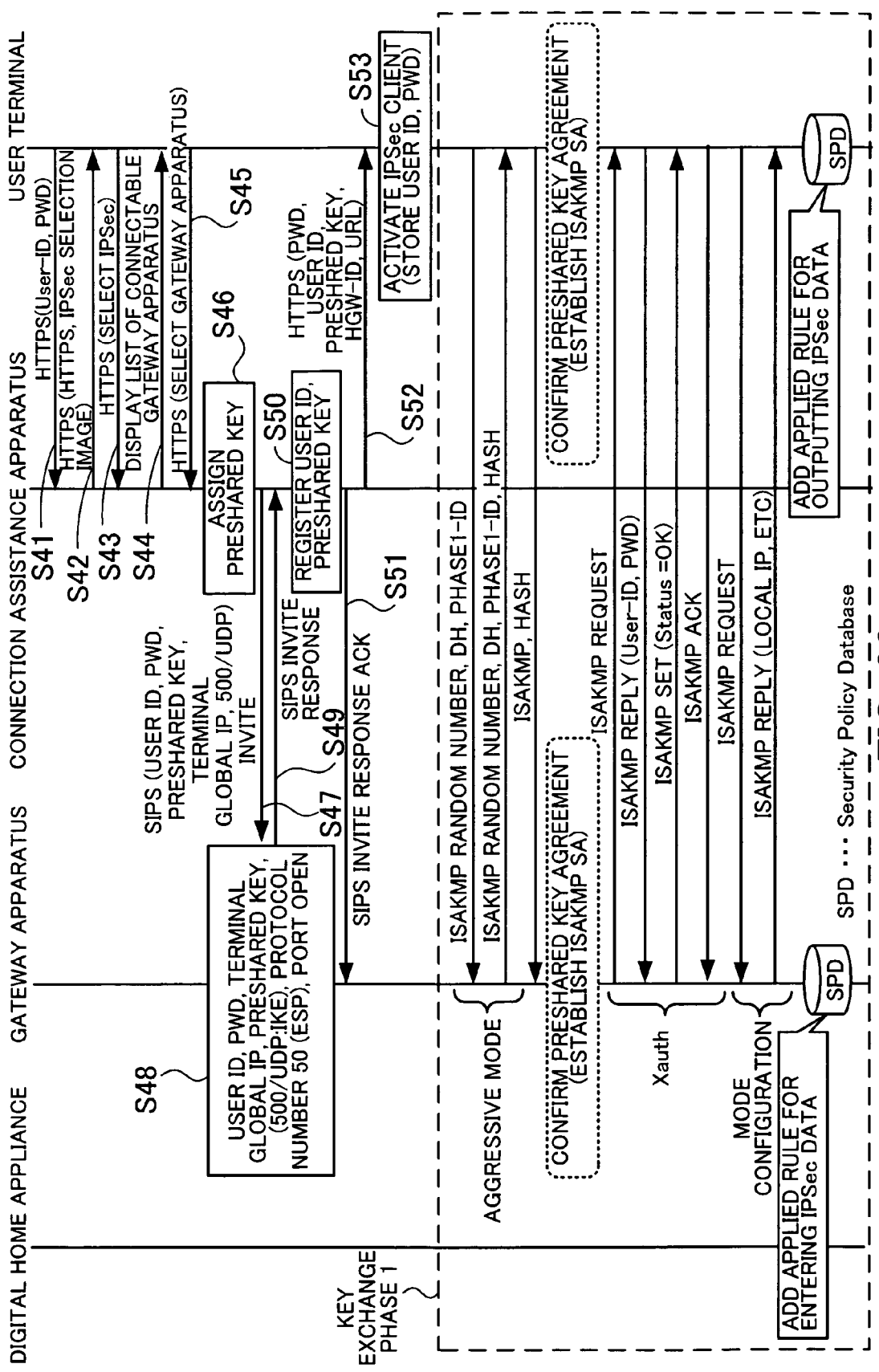
FIG. 22 is a sequence diagram of the system shown in FIG. 21.

FIG. 22 is a sequence diagram of the system shown in FIG. 21. In FIG. 21, devices placed under the control of the gateway apparatus 150 are omitted from illustration. Actually, a digital home appliance and a PC, for example, are connected to the gateway apparatus 150.

For the user terminal 140 to log in the connection assistance apparatus 130, the user terminal 140 sends the user ID and the password to the connection assistance apparatus 130 in step S41. If the connection assistance apparatus 130 judges that the login is valid using the user ID and the password of the user terminal 140, then the connection assistance apparatus 130 displays a selection image on the display unit of the user terminal 140 to prompt the user to select either remote access according to the IPSec or remote access according to the HTTPS in step S42. The user terminal 140 accepts information from the user that indicates which remote access is selected, and sends the information to the connection assistance apparatus 130 in step S43. It is assumed here that the user has selected remote access according to the IPSec. The connection assistance apparatus 130 displays a list of gateway apparatus that the user terminal 140 can make remote access to according to the IPSec, on the display unit of the user terminal 140 in step S44. The user terminal 140 accepts information of the gateway apparatus selected by the user, and sends the information to the connection assistance apparatus 130 in step S45.

The connection assistance apparatus 130 dynamically assigns a preshared key to the user terminal 140 and the gateway apparatus 150 so that the user terminal 140 and the gateway apparatus 150 can perform encrypted communications according to the IPSec in step S46. The connection assistance apparatus 130 generates a firewall control message including the user ID, the password, the global IP address, and the preshared key of the user terminal 140, the ESP header number (50), and the IKE port number (500), and sends the generated firewall control message to the gateway apparatus 150 in step S47.

When the gateway apparatus 150 receives the firewall control message from the connection assistance apparatus 130, the gateway apparatus 150 generates the firewall information management database 61 shown in FIG. 10 and the user authentication management database 111 shown in FIG. 15, and manages the information stored in these databases in step S48. The gateway apparatus 150 returns an INVITE response of SIPS to the connection assistance apparatus 130 in step S49. The connection assistance apparatus 130 stores the user ID and the preshared key of the user terminal 140 which has logged in the connection assistance apparatus 130, in the user session management database 54 in step S50. In response to the INVITE response from the gateway apparatus 150, the connection assistance apparatus 130 returns an ACK signal to the gateway apparatus 150 in step S51. The connection assistance apparatus 130 sends the preshared key, the user ID and the password of the user terminal 140 which has logged in the connection assistance apparatus 130, and the IP address and the URL of the gateway apparatus 150 to the user terminal 140 in step S52. The user terminal 140 activates an IPSec client for performing encrypted communications according to the IPSec, and stores the user ID and the password in step S53. If the user terminal 140 stores the user ID and the password when it sends them in step S41, then the user terminal 140 is not required to store them in step S53.

Subsequently, the user terminal 140 and the gateway apparatus 150 perform the key exchange processes of Phase 1 and Phase 2 as described above with reference to FIGS. 16, 17. The user terminal 140 is now capable of communicating with the devices under the control of the gateway apparatus 150.

The sequence of the key exchange process of Phase 2 is omitted from illustration in FIG. 22.

Operation of the system shown in FIG. 21 in case a gateway apparatus according to the HTTPS is selected will be described below with reference to a sequence diagram.

Figure 23:
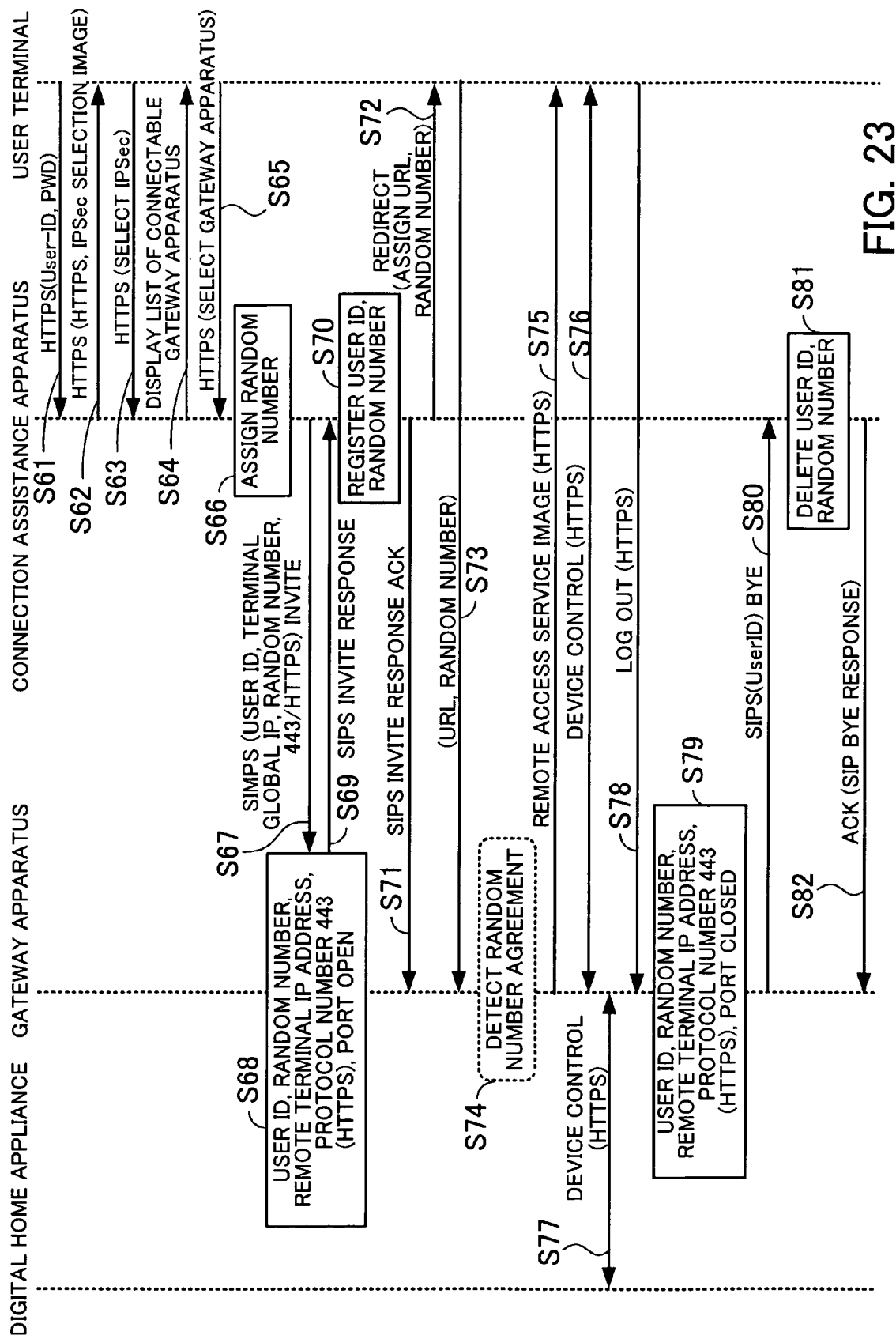
FIG. 23 is a sequence diagram in a case where a gateway apparatus according to HTTPS is selected.
Figure 24:
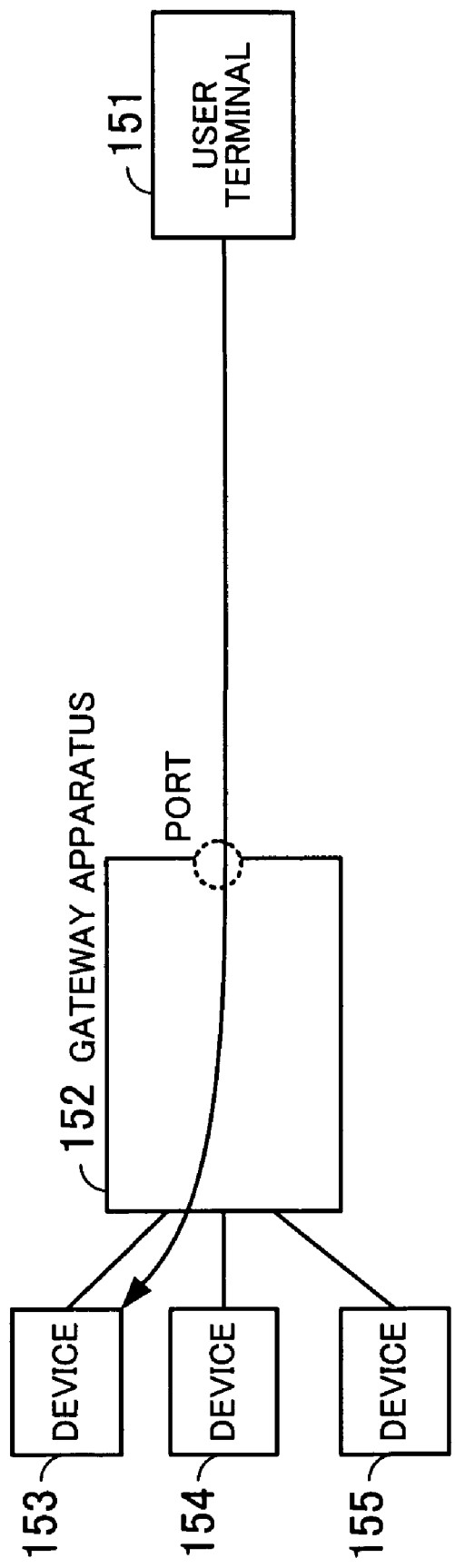
FIG. 24 is a block diagram illustrative of an example of remote access according to the IPSec—VPN.

FIG. 23 is a sequence diagram in case a gateway apparatus according to the HTTPS is selected. For the user terminal 140 to log in the connection assistance apparatus 130, the user terminal 140 sends the user ID and the password to the connection assistance apparatus 130 in step S61. If the connection assistance apparatus 130 judges that the login is valid using the user ID and the password of the user terminal 140, then the connection assistance apparatus 130 displays a selection image on the display unit of the user terminal 140 to prompt the user to select either remote access according to the IPSec or remote access according to the HTTPS in step S62. The user terminal 140 accepts information from the user that indicates which remote access is selected, and sends the information to the connection assistance apparatus 130 in step S63. It is assumed here that the user has selected remote access according to the HTTPS. The connection assistance apparatus 130 displays a list of gateway apparatus that the user terminal 140 can make remote access to according to the HTTPS, on the display unit of the user terminal 140 in step S64. The user terminal 140 accepts information of the gateway apparatus selected by the user, and sends the information to the connection assistance apparatus 130 in step S65.

The connection assistance apparatus 130 dynamically assigns a random number to the user terminal 140 and the gateway apparatus 150 so that the user terminal 140 and the gateway apparatus 150 can perform encrypted communications according to the HTTPS in step S66. The connection assistance apparatus 130 generates a message including the user ID, the password, the global IP address, and the random number of the user terminal 140, and a port number 443, and sends the generated message to the gateway apparatus 150 in step S67.

The gateway apparatus 150 stores the message sent from the connection assistance apparatus 130 in a storage unit, and opens a port represented by the port number 443 (HTTPS) in step S68. The gateway apparatus 150 returns a response with respect to message sent in step S67 to the connection assistance apparatus 130 in step S69.

The connection assistance apparatus 130 registers the random number assigned to the user terminal 140 and the gateway apparatus 150 and the user ID in a database in step S70. The connection assistance apparatus 130 returns an ACK signal with respect to the response sent in step S69 to the gateway apparatus 150 in step S71. The connection assistance apparatus 130 sends information including the URL and the random number of the gateway apparatus to the user terminal 140 for redirection in step S72. The user terminal 140 accesses the gateway apparatus 150 according to the URL, and sends the random number to the gateway 150 in step S73.

If the gateway apparatus 150 detects an agreement between its random number and the random number from the user terminal 140 in step S74, the gateway apparatus 150 displays a remote access service image on the display unit of the user terminal 140 in step S75. The user terminal 140 is now capable of controlling the devices, i.e., the digital home appliance and the PC, through the gateway apparatus 150 in steps S76, S77.

When the remote access to the devices is finished, the user terminal 140 logs out in step S78. In response to the logout of the user terminal 140, the gateway apparatus 150 deletes the user ID, the random number, and the global address of the user terminal 140 from the storage unit, and closes the port of the protocol number 443 in step 79. The gateway apparatus 150 then sends a BYE message of SIPS to the connection assistance apparatus 130 in step S80.

When the connection assistance apparatus 130 receives the BYE message from the gateway apparatus 150, the connection assistance apparatus 130 deletes the user ID of the user terminal 140 and the assigned random number from the database in step S81. In response to the BYE message, the connection assistance apparatus 130 returns an ACK signal to the gateway apparatus 150 in step S82.

As described above, the connection assistance apparatus 130 lets the user terminal 140 select either remote access according to the IPSec or remote access according to the HTTPS. Therefore, the user terminal 140 is provided with a flexible remote access unit depending on the ability of the user terminal 140 and the corresponding protocol of the gateway apparatus 150.

In addition, the user can recognize the corresponding communication protocol of the gateway apparatus 150 in advance for avoiding possible connection failures and other troubles.

As described above, the connection assistance apparatus according to the present invention authenticates the validity of the user. If the user is a valid user, then the connection assistance apparatus generates a preshared key and firewall opening instruction information for enabling IPSec communications. The connection assistance apparatus sends the preshared key to the terminal of the user, and also sends the preshared key and the firewall opening instruction information to the gateway apparatus. The gateway apparatus may open its ports for the terminal when it receives the firewall opening instruction information. Therefore, the gateway apparatus does not need to keep the ports open at all times, and hence can avoid unauthorized access and DoS attacks and prevent its performance from being degraded. Since the connection assistance apparatus generates the preshared key, the terminal is not required to store the preshared key for the gateway apparatus, and does not need to recognize different connections to the gateway apparatus.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A connection assisting method on a connection assistance apparatus for assisting in connecting a terminal owned by a user and a gateway apparatus for IPSec communications therebetween, the connection assisting method comprising:

authenticating the validity of said user who owns said terminal;

generating, based on the authenticated validity of the user, a preshared key for use by said terminal and said gateway apparatus to generate a shared secret key for encryption of communication data;

generating a firewall opening instruction information to open a firewall of said gateway apparatus based on the authenticated validity of the user;

transmitting said preshared key to said terminal and said gateway apparatus; and transmitting said firewall opening instruction information to said gateway apparatus.

2. The connection assisting method according to claim 1, wherein said transmitting of said firewall opening instruction information adds said preshared key, information representing an ESP header, an IKE port number, and an IP address of said terminal to said firewall opening instruction information, before transmitting said firewall opening instruction information to said gateway apparatus.

3. The connection assisting method according to claim 2, further comprising:

determining the version of an IP protocol of said terminal; and setting the protocol number of IPv4 to 50 as the information representing the ESP header when said version is IPv4.

4. The connection assisting method according to claim 2, further comprising:

determining the version of an IP protocol of said terminal;

setting the next header number of IPv6 to 50 as the information representing the ESP header when said version is IPv6.

5. The connection assisting method according to claim 2, further comprising:

transmitting, upon receipt of a response to said firewall opening instruction information from said gateway apparatus, terminal information including said preshared key, an IP address of said gateway apparatus, and information for allowing said terminal to access a device, to said terminal.

6. The connection assisting method according to claim 5, wherein said terminal establishes said IPSec communications with said gateway apparatus based on said terminal information.

7. The connection assisting method according to claim 1, wherein:

said authenticating uses an identifier and a password of said user to authenticate the validity of said user, and the connection assisting method further comprises transmitting the identifier and the password of said user from said connection assistance apparatus to said gateway apparatus.

8. The connection assisting method according to claim 7, wherein said gateway apparatus receives an identifier and a password from said terminal, and authenticates the validity of said user by comparing said identifier and password received from said terminal with said identifier and password received from said connection assistance apparatus.

9. The connection assisting method according to claim 1, further comprising:

letting said terminal select either said IPSec communications or HTTPS communications.

10. The connection assisting method according to claim 1, further comprising:

receiving communication information indicative of either said IPSec communications or HTTPS communications from said gateway apparatus.

11. A method executed on a gateway apparatus for performing IPSec communications with a terminal, the method comprising:
  receiving a preshared key and firewall opening instruction information from a connection assistance apparatus which authenticates the validity of a user who owns said terminal, generates said preshared key for use by said terminal and said gateway apparatus to generate a shared secret key for encryption of communication data, and generates said firewall opening instruction information to open a firewall of said gateway apparatus; and
  performing said IPSec communications with said terminal based on said preshared key and said firewall opening instruction information.

12. The method according to claim 11, wherein said preshared key is included in said firewall opening instruction information and sent from said connection assistance apparatus.

13. The method according to claim 12, wherein said performing performs said IPSec communications on data of an IP address of said terminal which is included in said firewall opening instruction information, based on said preshared key, and opens said firewall for data including said IP address and information representative of an ESP header or data including said IP address and an IKE port number.

14. The method according to claim 12, wherein said received firewall opening instruction information includes an identifier and a password of said user, said gateway apparatus further comprising:
  receiving an identifier and a password from said terminal, and
  authenticating said terminal by comparing said identifier and password received from said terminal with said identifier and password included in said received firewall opening instruction information.

15. The method according to claim 12, further comprising:
  deleting said firewall opening instruction information from a storage unit when said terminal logs out.

16. The method according to claim 11, further comprising:
  managing a device which is controllable by said terminal and sending information about said device to said terminal.

17. The method according to claim 11, further comprising:
  permitting said terminal to access only a device which is controllable by said terminal.

* * * * *